United States Patent
Pogorzelski et al.

(10) Patent No.: US 9,705,392 B2
(45) Date of Patent: Jul. 11, 2017

(54) PHASE GATING CONTROLLER AND METHOD FOR PHASE GATING CONTROL

(71) Applicant: Robert Bosch GmbH, Stuttgart (DE)

(72) Inventors: Kamil Pogorzelski, Stuttgart (DE); Jacek Wiszniewski, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 202 days.

(21) Appl. No.: 14/284,921

(22) Filed: May 22, 2014

(65) Prior Publication Data

US 2014/0346994 A1 Nov. 27, 2014

(30) Foreign Application Priority Data

May 24, 2013 (DE) .................. 10 2013 209 696

(51) Int. Cl.
*H02M 1/08* (2006.01)
*H02P 23/00* (2016.01)
*H02P 7/295* (2016.01)
*H02M 5/257* (2006.01)

(52) U.S. Cl.
CPC ........... *H02M 1/08* (2013.01); *H02M 5/2573* (2013.01); *H02P 7/295* (2013.01); *H02P 23/00* (2013.01)

(58) Field of Classification Search
CPC ... H05B 37/02; H05B 41/3924; H02M 1/081; H02M 2001/0006; H02M 5/2573; H02M 1/08; Y10T 307/766; G05B 11/28; H02P 23/00; H02P 7/295
USPC ....... 318/812, 437, 808, 809, 810, 805, 806; 363/126, 128; 323/239, 242, 299, 300, 323/327, 320, 311; 315/291, 307, 308; 327/453, 80, 79, 81, 83
See application file for complete search history.

(56) References Cited

U.S. PATENT DOCUMENTS

| | | | | |
|---|---|---|---|---|
| 3,569,819 A * | 3/1971 | Martzloff | ................ | H02M 1/38 363/136 |
| 3,984,753 A * | 10/1976 | Uchida | ................ | H02M 7/162 363/124 |
| 4,400,657 A * | 8/1983 | Nola | ................ | H03K 17/0824 318/729 |
| 4,418,333 A * | 11/1983 | Schwarzbach | ..... | G05B 19/0421 340/12.29 |
| 4,527,109 A * | 7/1985 | Hosokawa | ............ | H02P 25/023 318/715 |
| 4,766,360 A * | 8/1988 | Haraguchi | .............. | H02P 27/16 318/732 |
| 5,592,062 A * | 1/1997 | Bach | ....................... | H02P 25/14 318/805 |
| 6,211,792 B1 * | 4/2001 | Jadric | .................. | H02H 7/0844 318/800 |

(Continued)

*Primary Examiner* — Rita Leykin
(74) *Attorney, Agent, or Firm* — Maginot, Moore & Beck LLP

(57) ABSTRACT

A phase gating controller includes a thyristor/triac having a control terminal and two power terminals, a sampling device for sampling a voltage present across the power terminals of the thyristor/triac and a control device configured to provide a control voltage at the control terminal in order to trigger the thyristor/triac. The control device is further configured to switch off the control voltage at the triggered thyristor and to detect an unexpected turning-off of the thyristor/triac if the sampled voltage exceeds a predetermined threshold value.

8 Claims, 4 Drawing Sheets

(56) References Cited

U.S. PATENT DOCUMENTS

| | | | | |
|---|---|---|---|---|
| 6,404,346 B1* | 6/2002 | Jadric | ............... | G01R 31/263 |
| | | | | 340/635 |
| 7,347,379 B2* | 3/2008 | Ward | ............... | G06K 7/10336 |
| | | | | 235/492 |
| 7,551,411 B2* | 6/2009 | Woods | ............... | B24B 23/028 |
| | | | | 318/434 |
| 7,817,384 B2* | 10/2010 | Woods | ............... | B24B 23/028 |
| | | | | 318/432 |
| 8,094,471 B1* | 1/2012 | Smith | ............... | H02M 1/10 |
| | | | | 363/61 |
| 8,630,074 B2* | 1/2014 | Ham | ............... | H03K 17/725 |
| | | | | 361/103 |
| 8,957,662 B2* | 2/2015 | Newman, Jr. | ............... | H05B 33/0815 |
| | | | | 323/241 |
| 8,988,050 B2* | 3/2015 | Newman, Jr. | ............... | H02M 7/06 |
| | | | | 323/239 |
| 9,130,374 B2* | 9/2015 | Umeda | ............... | H02J 3/00 |

* cited by examiner

PHASE GATING CONTROLLER AND METHOD FOR PHASE GATING CONTROL

This application claims priority under 35 U.S.C. §119 to patent application no. DE 10 2013 209 696.8, filed on May 24, 2013 in Germany, the disclosure of which is incorporated herein by reference in its entirety.

BACKGROUND

The present disclosure relates to a phase gating controller and to a control method. In particular, the disclosure relates to a phase gating controller for power control of a load.

A phase gating controller is used to operate a load from an alternating current with variable power. In this case, the load may comprise a predominantly ohmic load, such as a light bulb, or a mixed ohmic and inductive load, such as an electric motor. A thyristor or a triac, which is an interconnection of two thyristors connected back-to-back, is used in order to connect the load to the alternating current. The thyristor has two power terminals, one of which is connected to the load and the other of which is connected to the AC voltage. A control terminal is also provided. The thyristor provides an electrical connection from the first to the second power terminal when a voltage at the control terminal exceeds a predetermined threshold value. This process is known as triggering. The conductivity of the thyristor between the power terminals is then maintained even when the control voltage at the control input is switched off. In order to turn off the thyristor, that is to say to end the conductivity between the power terminals once again, a holding current through the power terminals of the thyristor must decrease below a predetermined threshold value. This is usually the case at every zero crossing of the current.

In order to control the power to the load, the control voltage is not applied to the control input at the beginning of each half-cycle of the AC voltage, but only later. By way of example, it is possible for the instant at which the control voltage is applied to be dependent on a voltage value of the AC voltage at one of the power terminals. The thyristor is then triggered at a predetermined point in the half-cycle and remains switched on until the end of the half-cycle. The later the triggering takes place, the shorter the time in which the load is connected to the alternating-current source and therefore also the lower the power converted in the load.

Owing to vibrations, wear or, if the load is a commutated electric motor, bad commutation, the current flowing through the thyristor/triac can temporarily fall below the holding current, which can lead to the thyristor being turned off if the control voltage at the triggered thyristor is not maintained while the thyristor is conducting. However, maintaining the control voltage causes a certain power loss and may necessitate more expensive wiring of the thyristor. Therefore, the problem addressed by the disclosure is to specify an improved phase gating controller, a method for phase gating control and a corresponding computer program product, by means of which said disadvantages can be avoided. The disclosure solves said problem by means of a phase gating controller, a method for phase gating control and a computer program product having the features disclosed herein.

SUMMARY

A phase gating controller according to the disclosure comprises a semiconductor component having the function of a thyristor, in particular a thyristor having a control terminal and two power terminals, a sampling device for sampling a voltage present across the power terminals of the thyristor and a control device for providing a control voltage at the control terminal in order to trigger the thyristor. The thyristor may be included in a triac. In this case, the control device is designed to switch off the control voltage at the triggered thyristor and to detect an unexpected turning-off of the thyristor if the sampled voltage exceeds a predetermined threshold value.

Since a triac always also includes a thyristor, thyristor and triac are only differentiated in the following text where specific features of the triac are mentioned.

By switching off the control voltage at the triggered thyristor, a power loss at the thyristor can be reduced.

In a particularly preferred embodiment, the countermeasures comprise once more triggering the thyristor, which has been unexpectedly turned off, by means of the control voltage. In comparison with another solution in which the thyristor is quickly triggered only once per half-cycle and an occasional turning-off is accepted, the output power can be reduced by the turning-off. The output power can be maximized by triggering once again within the same half-cycle. An output device is preferably also provided, wherein the control device is designed to output an error signal by means of the output device if the sampled voltage exceeds the threshold value.

The output device may comprise, for example, a visual, audible or tactile output device which is directed toward a user of the phase gating controller. The user can thus be prompted to have qualified personnel carry out maintenance on the control device.

In another embodiment, the output device comprises an error store for storing an item of error information. A range of information, which accompanies the unexpected turning-off or precedes or follows it, can be stored in the error store. The phase gating controller and/or the load can be subjected to an improved service on the basis of the collected information.

In a particularly preferred embodiment, the phase gating controller is designed to control a commutated electric motor. In this case, the phase gating controller can be integrated with the electric motor jointly in one device. A device of this type may include, in particular, an electrical hand tool.

A method according to the disclosure for phase gating control with a thyristor, which has a control terminal and two power terminals, comprises steps of triggering the thyristor by means of a control voltage, switching off the control voltage at the triggered thyristor and detecting an unexpected turning-off of the thyristor if a voltage present across the power terminals of the thyristor exceeds a predetermined threshold value. Preferably, the thyristor is in this case triggered once again by means of the control voltage.

In one embodiment, one of the power terminals of the thyristor is connected to an AC voltage and a renewed triggering of the thyristor does not take place when the next zero crossing of the AC voltage is less than a predetermined time away. As a result, an extremely short-term triggering of the thyristor can be avoided. As a result, the load and the thyristor can be protected from a short voltage pulse.

In another variant, which can be combined with the above variant, the control voltage is switched off in the region of the zero crossing of the AC voltage. This absolute switch-off of the control voltage means that an unintentional triggering of the thyristor can be avoided; in particular, the renewed triggering can reliably remain limited to the present half-cycle.

A computer program product according to the disclosure comprises program code means for implementing the described method when the computer program product is executed on a processing device or is stored on a computer-readable data carrier.

BRIEF DESCRIPTION OF THE DRAWINGS

The disclosure will now be described in more detail with reference to the appended figures, in which.

DETAILED DESCRIPTION

Figure 1:
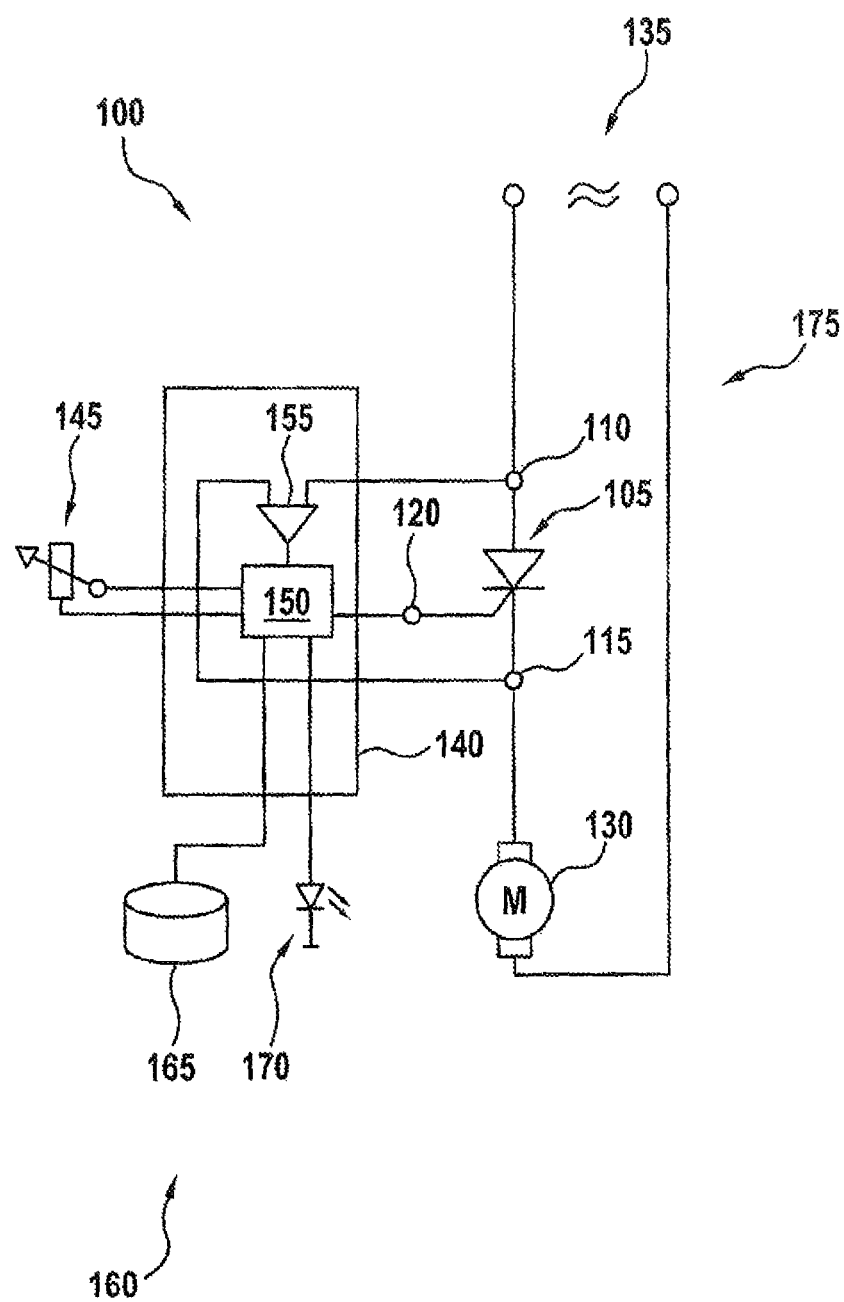
FIG. 1 illustrates a circuit diagram of a phase gating controller.

FIG. 1 shows a circuit diagram of a phase gating controller 100. A thyristor 105 comprises a first power terminal 110, a second power terminal 115 and a control terminal 120. One of the power terminals 110, 115 is connected to the load 130, which can comprise, in particular, an electric motor. A free terminal of the load 130 and the remaining power terminal 115, 110 are connected to terminals of an AC voltage source 135, which can comprise, for example, an AC voltage system at a frequency of approximately 50 Hz or approximately 60 Hz.

The phase gating controller 100 comprises the thyristor 105 and a control device 140. The control device 140 is designed to provide a control voltage at the control terminal 120 of the thyristor 105 in order to trigger the thyristor 105. An input means 145, which is illustrated by way of example as a potentiometer in the illustration of FIG. 1, is optionally also provided in order to allow a user to determine the instant at which the thyristor 105 is triggered and hence to determine the electric power which can be converted by the load 130. Preferably, the control device 140 comprises a processing device 150 for sampling the input means 145 and for providing the control voltage. The control device 140 also comprises a sampling device 155 for sampling a voltage present across the power terminals 110, 115 of the thyristor 105. The sampled voltage can be supplied to the processing device 150 for comparison with a threshold value. Alternatively, the comparison with the threshold value can already take place in the sampling device 155 and a corresponding signal indicating whether the sampled voltage exceeds the threshold value can be supplied to the processing device 150.

In the illustrated embodiment, two output devices 160 are provided. A first optional output device 160 comprises an error store 165 for receiving an item of information which may accompany or precede or follow an unexpected turning-off of the thyristor 105. Information of this type may comprise time information, load information, different currents and/or voltages and one or more temperatures in the region of the phase gating controller 100. Each of the stated items of information may also relate to the temporal profile which corresponds to said item of information. An optional second output device 160 comprises a light-emitting diode 170 which represents a visual output device which is directed toward a user of the phase gating controller 100. In addition or as an alternative to the light-emitting diode 170, an audible and/or tactile output device can also be provided, said device being directed toward the user of the phase gating controller 100.

The shown elements, in particular the thyristor 105, the control device 140 and the load 130, can be comprised in a common device 175, which, for example, comprises an electrical hand tool.

The control device 140 is designed to switch off the control voltage at the control terminal 120 of the thyristor 105 once the latter has been triggered. On the basis of a voltage which is sampled at the power terminals 110 and 115, it can then be determined whether the thyristor 105 has been unexpectedly triggered. In the event of this, a corresponding item of information can be output via one of the output devices 160. In addition, a further measure can be taken, in particular the thyristor 105 can be triggered once again by means of a control voltage at the control terminal 120.

Figure 2:
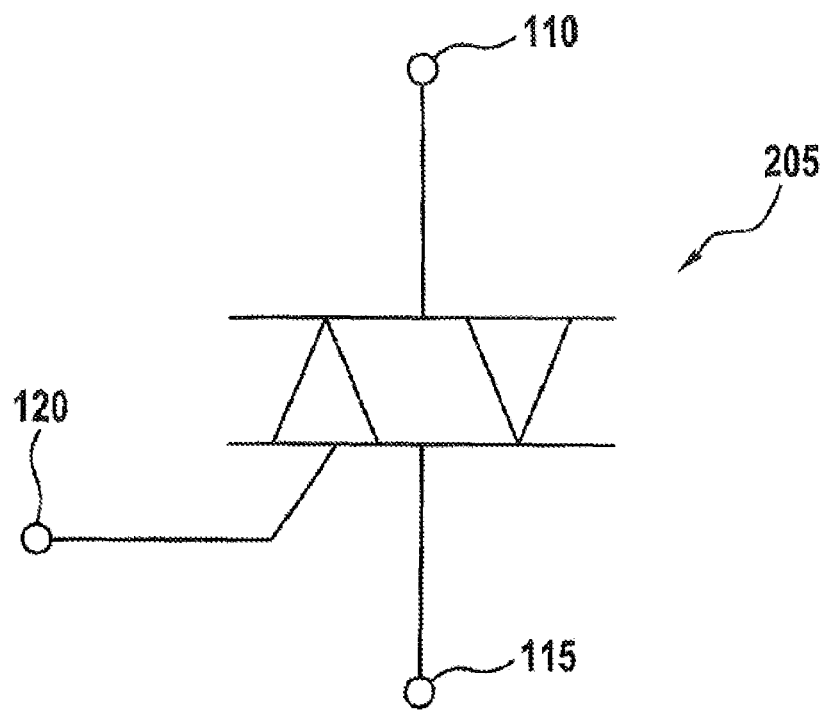
FIG. 2 illustrates a circuit diagram of a triac for the phase gating controller from FIG. 1.

FIG. 2 shows a circuit diagram of a triac for the phase gating controller 100 from FIG. 1. The triac 205 corresponds to an interconnection of two thyristors 105 connected back-to-back corresponding to that from FIG. 1. Since the thyristor 105 permits an electric current only in one direction between the power terminals 110 and 115, the triac 205 lends itself to the operation of the phase gating controller 100 from the AC voltage source 135 in order to make use both of the positive and of the negative half-cycles. The triac 205 is readily exchangeable for the thyristor 105 in the phase gating controller 100 from FIG. 1. Alternatively, the shown interconnection of two thyristors 105 connected back-to-back can be used instead of the single thyristor 105 in the phase gating controller 100 from FIG. 1. Other designs of thyristors 105 or triacs 205, which include, for example, an optocoupler for coupling in the control voltage, can easily be used.

Figure 3:
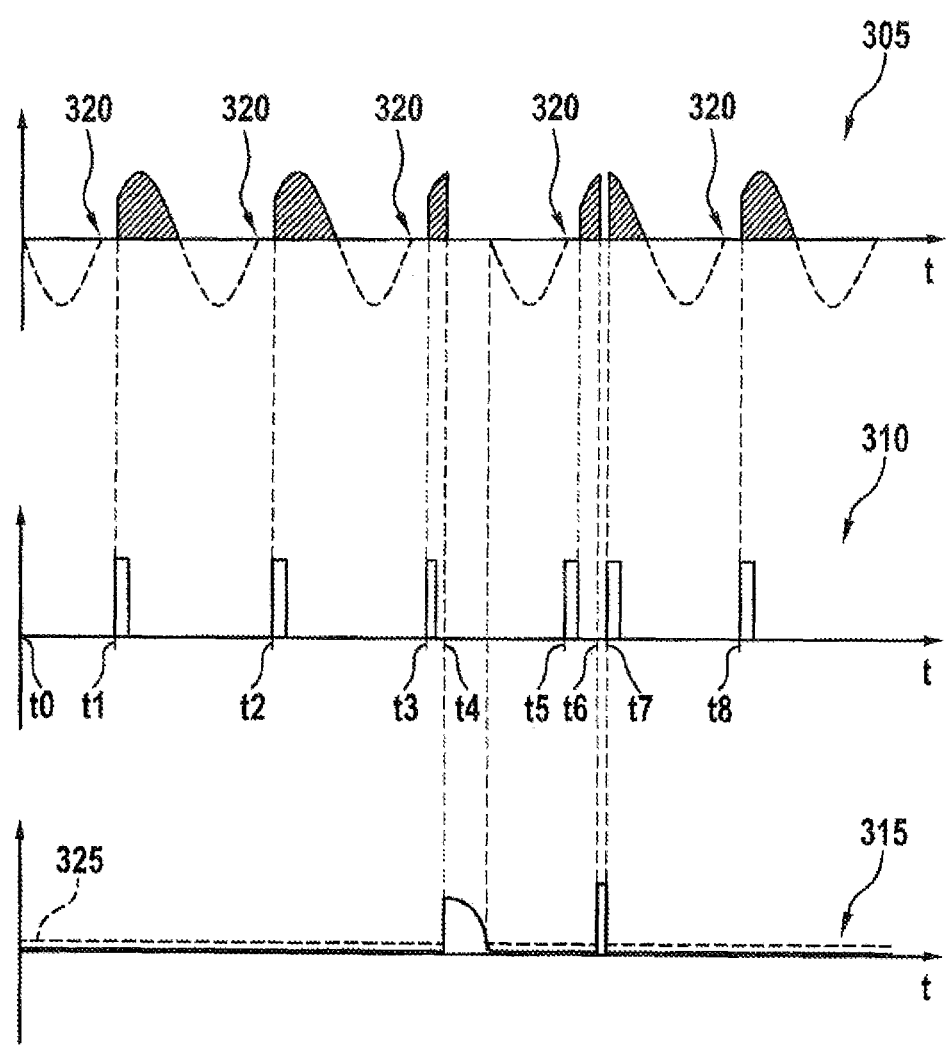
FIG. 3 illustrates temporal profiles at the phase gating controller from FIG. 1.

FIG. 3 shows temporal profiles at the phase gating controller 100 from FIG. 1. A first profile 305 of a voltage across the load 130 is illustrated in an upper region, a second profile 310 of a control voltage at the control terminal 120 is illustrated in a central region, and a third profile 310 of a voltage across the power terminals 110 and 115 is illustrated in a lower region.

It can be seen on the first profile 305 how the voltage across the load 130 is switched on after a predetermined time after a zero crossing 320 owing to a pulse of the control voltage of the second profile 310. The interval between a zero crossing 320 and a pulse of the control voltage is dependent, for example, on a position of the input means 145 in FIG. 1. In the illustrated embodiment, it is not a triac 205 but a thyristor 105 which is assumed, as can be seen at the exclusively positive portion of the voltage of the first profile 305.

The control voltage is applied in each case only for a short pulse to trigger the thyristor 105. In one embodiment, the duration of said pulse is predetermined, for example to be a few hundred microseconds. As a result, the control voltage can rapidly return to a value of zero or approximately zero when the thyristor 105 has been triggered and a power loss caused by the control voltage can be reduced.

At an instant T4, the thyristor 105 is unexpectedly turned off, for example owing to a temporary interruption of the current flow within the load 130. In response to this, the voltage of the third profile 315 exceeds a predetermined threshold value 325. The unexpected turning-off of the thyristor 105 can be detected by means of the sampling device 155 on the basis of said voltage exceeding said threshold value. If no further measures are taken as a result, the voltage of the first profile 305 across the load 130 remains at 0 for the rest of the present half-cycle.

However, in such an event, the control device 140 preferably drives the thyristor to trigger once again. The corresponding correlation is illustrated from an instant T5. At the instant T5, a pulse is output to the control input 120 of the thyristor 105 in order to trigger the thyristor 105. At an instant T6, the thyristor is unexpectedly turned off as before at instant T4. The voltage of the third profile 315 subsequently exceeds the threshold value 325. At the instant T7, which follows the instant T6 after a predetermined reaction time, the control device 140 has detected the unexpected turning-off and outputs a further control pulse to the control terminal 120 of the thyristor 105 in order to trigger the latter once again. The thyristor 105 is triggered and, for the remainder of the present half-cycle, the voltage of the AC voltage source 135 is present across the load 130 again. At the same time as the renewed triggering at the instant T7, the control device 140 can also output a corresponding item of information to one of the output devices 160. Several renewed triggering attempts can also be made in the same half-cycle if the unintentional turning-off occurs more than once.

Figure 4:
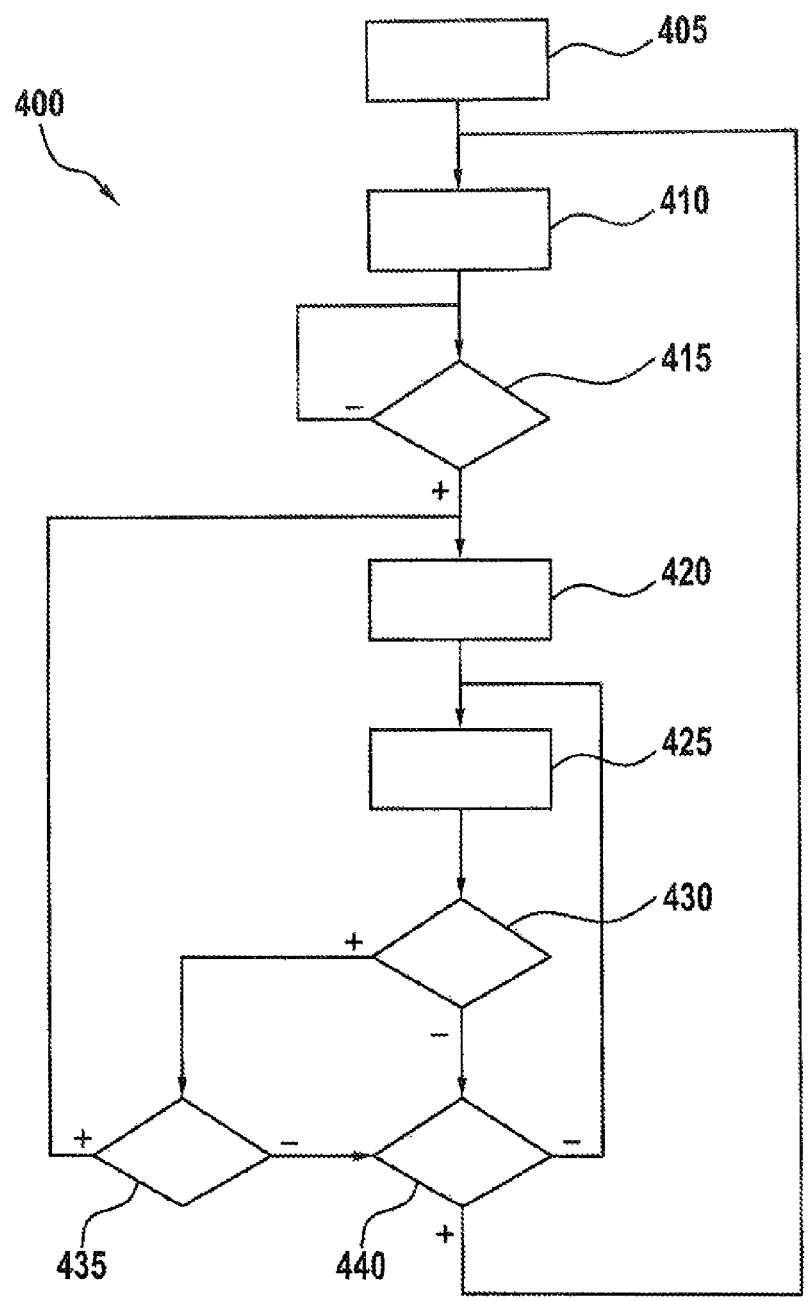
FIG. 4 illustrates a flowchart of a method for phase gating control.

FIG. 4 shows a flowchart of a method 400 for controlling the phase gating controller 100 from FIG. 1. A step 405, without restriction of generality, starts out from a zero crossing 320 of the AC voltage of the AC voltage source 135 and from a control voltage of zero at the control input 120. Subsequently, in a step 410, a switch-on instant is determined, preferably on the basis of a position of the input means 145. A step 415 involves waiting until the previously determined switch-on instant has been reached. Then, in a step 420, a control voltage is output to the control input 120 of the thyristor 105 or, respectively, the triac 205. As a result, the thyristor 105 is triggered and the load 130 is supplied with a voltage. The control voltage is only maintained for a short amount of time, for example until the voltage present at the power terminals 110 and 115 has fallen below a predetermined value or after a predetermined time.

In a subsequent step 425, the voltage at the power terminals 110 and 115 of the thyristor 105 or, respectively, the triac 205 is sampled by means of the sampling device 155. In a step 430, the sampled voltage is compared with the threshold value 325. If the voltage is above the threshold value then an unintentional turn-off of the thyristor 105 or, respectively, the triac 205 is present.

Then, in a step 435, it can optionally also be determined whether or not a renewed triggering process should be performed. By way of example, a renewed triggering process can be dispensed with if the next zero crossing 320 is less than a predetermined time away. This is particularly sensible if pulses of the control voltage at the control terminal 120 have a predetermined length and the next zero crossing 320 is less than the pulse length away.

In another embodiment, the renewed triggering process following step 430 is always performed when the voltage at the power terminals 110 and 115 of the thyristor 105 or, respectively, the triac 205 is greater than zero, that is to say no zero crossing 320 is about to take place. The control voltage at the control terminal 120 can then always be switched off when the zero crossing 320 occurs.

If further triggering occurs, the method 400 continues with the step 420 already described above. Otherwise, a step 440 involves waiting for the next zero crossing 320. The step 440 is also performed in the event that it is determined in step 430 that the sampled voltage is not greater than the threshold value 325. If no new zero crossing 320 is present in step 440, the method 400 branches back to step 425. Otherwise, the method 400 continues with the step 410.

What is claimed is:

1. A phase gating controller comprising:
   a thyristor including a control terminal and two power terminals;
   a sampling device configured to sample a voltage present across the power terminals of the thyristor; and
   a control device configured (i) to provide a control voltage at the control terminal in order to trigger the thyristor, (ii) to switch off the control voltage at the triggered thyristor, and to detect an unexpected turning-off of the thyristor if the sampled voltage exceeds a predetermined threshold value, and (iii) to once more trigger the thyristor, which has been unexpectedly turned off, with the control voltage.

2. The phase gating controller according to claim 1, further comprising:
   an output device,
   wherein the control device is further configured to output an error signal if the sampled voltage exceeds the predetermined threshold value.

3. The phase gating controller according to claim 2, wherein the output device includes an error store configured to store an item of error information.

4. The phase gating controller according to claim 1, wherein the phase gating controller is configured to control a commutated electric motor.

5. An electrical hand tool comprising:
   an electric motor; and
   a phase gating controller configured to control the electric motor, the phase gating controller including a thyristor having a control terminal and two power terminals, a sampling device configured to sample a voltage present across the power terminals of the thyristor, and a control device configured (i) to provide a control voltage at the control terminal in order to trigger the thyristor, (ii) to switch off the control voltage at the triggered thyristor, and to detect an unexpected turning-off of the thyristor if the sampled voltage exceeds a predetermined threshold value, and (iii) to once more trigger the thyristor, which has been unexpectedly turned off, with the control voltage.

6. A method for phase gating control with a thyristor which includes a control terminal and two power terminals, comprising:
   triggering the thyristor with a control voltage;
   switching off the control voltage at the triggered thyristor; and
   detecting an unexpected turning-off of the thyristor if a voltage present across the power terminals of the thyristor exceeds a predetermined threshold value wherein one of the power terminals of the thyristor is connected to an AC voltage and a renewed triggering of the thyristor does not take place when a next zero crossing of the AC voltage is less than a predetermined time away.

7. The method according to claim 6, wherein one of the power terminals of the thyristor is connected to an AC voltage and the control voltage is switched off in the region of a zero crossing of the AC voltage.

8. The method according to claim 6, wherein a computer program product includes a program code configured to implement the method when the computer program product is executed on a processing device or is stored on a computer-readable data carrier.

\* \* \* \* \*